March 12, 1929.   F. S. SMITH   1,705,033
COOLING MEANS FOR INSULATED ELECTRODES
Original Filed July 29, 1924
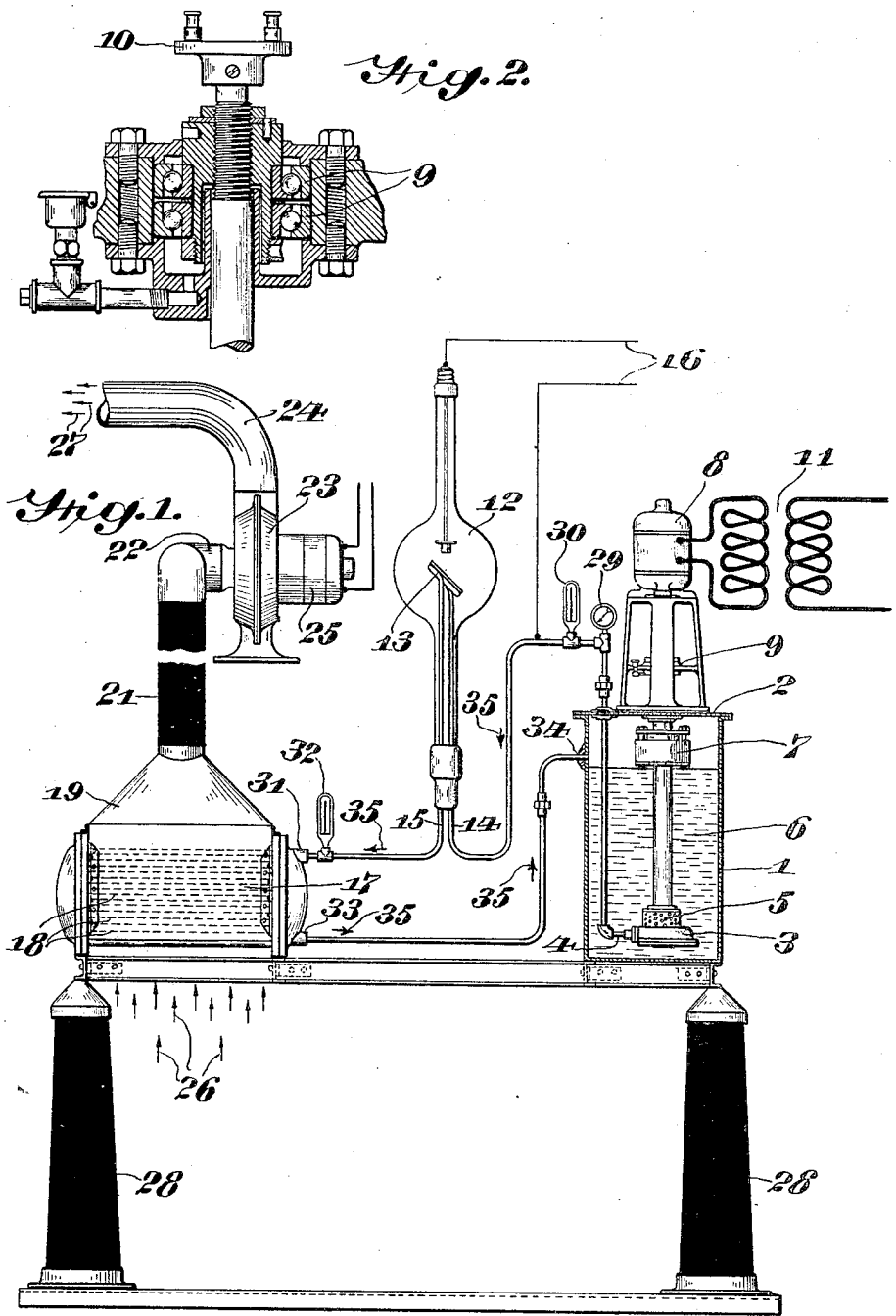
INVENTOR
Franklin S. Smith
BY
Cyrus N. Anderson
ATTORNEY Patented Mar. 12, 1929.

1,705,033

UNITED STATES PATENT OFFICE.

FRANKLIN S. SMITH, OF BROOKLYN, NEW YORK, ASSIGNOR TO THE PRODUCTS PROTECTION CORPORATION, OF NEW YORK, N. Y., A CORPORATION OF DELAWARE.

COOLING MEANS FOR INSULATED ELECTRODES.

Application filed July 29, 1924, Serial No. 728,987. Renewed June 9, 1928.

My invention relates to that class of electrical apparatus in which an insulated electrode is cooled by means of a heat transferring liquid which usually is water. In such cooling means the heat which is absorbed by the liquid from the electrode is transferred by the liquid to a suitable cooler or heat transferring apparatus from which the heat is absorbed by air. In such apparatus the liquid is caused to circulate through a closed system by means of a pump; and the air is passed across the heat transferring apparatus by means of a blower and allowed to escape.

In the operation of cooling an electrode in the manner above indicated certain difficulties are encountered. One of these consists in preventing the liquid (water) which may leak from the stuffing box of the pump from causing damage; another is the difficulty of lubricating adequately the pump bearings in case the liquid which is used as the heat transferring or cooling medium should be water.

If there should be leakage of the liquid from the circulatory cooling system the damage which may result is of two kinds. First, an appreciable loss of the liquid will cause a temperature rise of the electrode due to the lessened thermal capacity of the liquid remaining in the system; and second, damage may be caused by transient electric phenomena, due to the electrical conductivity of the liquid which may leak to the ground or to some other part of the electrical apparatus.

The difficulty of lubricating the pump bearings is well known to those familiar with the art to which the invention relates. This difficulty is particularly marked if water be used as the electrode cooling medium because the warm water washes the lubricant from the pump bearings. Such washing away or removal of the lubricant not only brings about a failure of proper and sufficient lubrication but results in considerable change in the thermal characteristics and constants of the heat transferring system. Experience has taught that the so called "oilless" bearings cannot be used satisfactorily in water.

My invention has for its general object to provide a novel construction of means for cooling insulated electrodes of electrical apparatus, particularly the anti-cathodes of X-ray tubes, which is and shall be free from the objections and deficiencies hereinbefore pointed out.

Other objects are: to provide a system for cooling the electrodes of electrical apparatus in which the possibility of damage due to leakage at the stuffing box of the pump of a circulatory cooling system is eliminated; to provide means for effecting satisfactory pump lubrication; and to provide a heat transferring liquid of such character that it will not only serve its proper function as a cooling medium but also will serve as a lubricant for the pump bearings.

Other objects and advantages of the invention will be pointed out in the detailed description thereof which follows or will be apparent from such description.

In order that the invention may be readily understood and its practical advantages fully appreciated reference may be had to the accompanying drawing in which I have illustrated one convenient form of means embodying the invention. However, it will be understood that the invention is susceptible of embodiment in other forms of construction than that shown and that change in the details of construction may be made within the scope of the claims without departing from the principle thereof.

In the drawing Fig. 1 is a view partly in section and partly in elevation showing schematically an apparatus embodying the invention, and Fig. 2 is a view in vertical section showing in detail a well known form of radial thrust bearing interposed between the pump and the power means by which said pump is operated.

The construction embodying the invention, as illustrated in the drawing, may be described generally as consisting essentially of a pumping unit, an X-ray tube, a heat transferring liquid and a cooling unit together with the necessary insulators and connections.

Although reference is made to an X-ray tube and such tube is shown in the drawing it is to be understood that the invention is not limited in its application to the cooling of electrodes of such tubes but may be employed in the cooling of electrodes of other devices to and for which it may be adapted.

Referring now to the drawing in detail it will be noted that the pumping unit comprises a receptacle which closed at its upper end by means of a top or cover 2 from which a rotary pump indicated at 3 is suspended vertically. The outlet from the pump is indicated at 4 and the inlet at 5. The pump 3 and its inlet and outlet are entirely submerged in the heat transferring liquid 6. The stuffing box 7, however, is shown within the receptacle 1 above the level of the liquid 6.

The motor 8 for operating the pump 3 is mounted on the top of the cover 2. This motor is of the vertical type and its shaft is connected to the pump shaft by means of a coupling which is a part of the radial thrust ball bearing indicated as a whole at 9 in Fig. 1 of the drawing. The lower part of the coupling is indicated at 10 in Fig. 2. The bearing which is shown in detail in Fig. 2 of the drawing will not be described in detail because it forms no part of the present invention.

Current for operating the motor 8 is supplied through the transformer 11 in which the two windings are insulated from each other for the voltage of excitation of the X-ray tube indicated at 12.

The X-ray tube 12 embodies an anti-cathode 13 of the known so called water cooled type. The said anti-cathode is of known construction and consists of a copper tube comprising a winding intermediate its ends, which winding is in the form of a spiral to which is secured by means of silver solder a thin copper disk which carries a thin tungsten plate in its front or inner face. The inlet through which the cooling liquid enters one end of the tube embodying the spirally wound portion previously referred to is indicated at 14 while the outlet to which the opposite end of the said tube is connected is indicated at 15. A high voltage electric current for exciting the X-ray tube 13 is supplied through the wires indicated at 16. The X-ray tube illustrated is of the hot cathode type which is well known and consequently will not be described by me. The cooling unit comprises a multi-tubular multi-pass cooler in which the liquid conveying or carrying tubes are indicated by dotted lines at 18. The cooler casing 19 is open at its bottom so that air may enter the same and flow around the exteriors of the tubes 18. The casing 19 is connected by means of an insulating tube 21 to the inlet 22 of a blower 23. The outlet side of the blower is connected to a pipe 24, as indicated. The blower 23 is driven or operated by a motor 25 which, because it is insulated from the X-ray tube voltage of excitation by the insulating tube 21, may be connected to the same voltage supply mains as is the primary of the transformer 11. As is indicated in the drawing, the air enters the cooler at the bottom of the casing as indicated by the arrows at 26 and flows transversely across the liquid conveying or carrying tubes 18 to the blower 23 from which it escapes through the outlet pipe 24 as indicated by the arrows at 27.

The apparatus or system is insulated from the ground by insulators 28 upon which it is supported.

Connection is made from the outlet 4 of the pump 3 to the inlet 14 by means of tubes as is clearly shown. A pressure gauge 29 is interposed in this connection for the purpose of indicating the pressure of the liquid in the system and likewise a thermometer 30 for indicating the temperature of the heat transferring liquid which enters the tube 14 of the anti-cathode 13. The outlet 15 from the anti-cathode tube is connected at 31 to the inlet to the tubes 18. A thermometer 32 is provided in the said connection for indicating the temperature of the heat transferring liquid after it has absorbed heat from the anti-cathode of the X-ray tube. Pipe or tube connection is made from the outlet 33 leading from the tubes 18 of the cooler to the receptacle 1, connection with the latter being made at 34. The direction of the flow of the cooling liquid through the system is indicated by the arrows 35.

Owing to the fact that the stuffing box 7 of the pump shaft is located within the receptacle 1 no damage can possibly result from the leakage of the heat transferring liquid therethrough because if there should be leakage of the liquid through the stuffing box it will return to the receptacle and become a part of the liquid in the system.

The radial ball thrust bearing 9, previously referred to, is located outside of the receptacle 1 and consequently any suitable desired lubricant may be employed for lubricating the same.

The liquid employed by me as the cooling medium of the system consists of a mixture of glycerin and water. In consequence the bearings of the rotary pump 3 may be lubricated thereby. I preferably employ bearings of graphite-bronze, so called, "oilless bearings", because if such bearings are used the percentage of glycerin required to be employed in the mixture may be considerably less than otherwise would be the case. These so called "oilless bearings" cannot be satisfactorily operated in water but they do operate satisfactorily in a mixture of glycerin and water when mixed in proportions on the order of 20% glycerin and 80% water by weight.

It is not feasible to set down further definite and exact proportions of glycerin and water to be used because the portions of the respective substances which may be used are dependent, generally speaking, upon the size and configuration of the bearings, the speed of rotation of the shaft therein, the load carried by the bearing and also the heat transferring factor.

The glycerin content should be only that which is sufficient to effect lubrication of the bearings because the increase of glycerin decreases the desirable thermal characteristics of the liquid and also the power required to cause or effect circulation of the liquid through the system is increased because of the greater viscosity of the glycerin.

One great advantage resultant from the use of a mixture of glycerin and water is that the fire hazard is practically nil which is not the case if oil be used. The thermal characteristics of the liquid comprising a mixture of glycerin and water are not quite equal to water alone but very much better than oil, being practically twice as good.

Having thus described my invention what I claim and desire to secure by Letters Patent is:

1. In a cooling system for insulated electrodes, in combination, a receptacle for holding a cooling liquid, tubular connections from said receptacle to the tubular element of the electrode to be cooled, and a pump within said receptacle for forcing the cooling liquid from the receptacle through the said tubular connections and thence back to the said receptacle, said pump being arranged in depending relation within said receptacle and being submerged within the cooling liquid in the receptacle whereby leakage from said pump is caught by said receptacle.

2. In a cooling system for cooling insulated electrodes, in combination, a receptacle for holding a cooling liquid, tubular connections from said receptacle to the electrode to be cooled for leading cooling liquid thereto and away therefrom, a pump for causing a circulation of said cooling liquid, and means for driving said pump, said pump, driving means and receptacle being related to each other so that leakage from said pump is caught by said receptacle.

3. In a cooling system for cooling insulated electrodes, in combination, a heat transferring apparatus, a pump, means for driving said pump, and means including tubular connections adapted to pass cooling liquid from said pump to the electrode to be cooled, thence through said heat transferring apparatus and thence back to said pump, said means including a chamber about said pump for preventing escape of cooling liquid that may leak from said pump.

4. In a cooling system for cooling insulated electrodes, the combination of a receptacle for holding a cooling medium, a heat transferring apparatus, tubular connections from the said receptacle to the said heat transferring apparatus, the said connections including a tubular element of an electrode, tubular connections from the said heat transferring apparatus to the said receptacle, and mechanically actuated means within the said receptacle for forcing the cooling medium therefrom through the first named tubular connections to the said heat transferring apparatus and from the latter back to the said receptacle, said means and said receptacle being related to each other so that leakage of cooling medium from said means is caught by said receptacle.

5. In a cooling system for insulated electrodes, the combination of a receptacle, a cooling medium within the said receptacle, a heat transferring apparatus, tubular connections from the said heat transferring apparatus to the said receptacle and mechanically actuated means within the said receptacle for causing circulation of the said cooling medium through the system, said means and said receptacle being related to each other so that leakage of cooling medium from said means is caught by said receptacle.

6. In a cooling system for insulated electrodes, the combination of a receptacle, a cooling medium consisting of a mixture of water and a miscible lubricating liquid, the mixed liquid being non-inflammable, a heat transferring apparatus, tubular connections between the said receptacle and the said apparatus, one of the said connections comprising an element of the electrode, and a pump located within the said receptacle for causing circulation of the said cooling medium through the system.

7. In a cooling system for insulated electrodes, the combination of a receptacle, a cooling medium within said receptacle, a heat transferring apparatus, tubular connections between the said receptacle and the said apparatus, a pump submerged within the said medium within the said receptacle, the stuffing box of which also is located in said receptacle, and means for operating the said pump to force circulation of the said medium through the system whereby it is adapted to effect cooling of an electrode.

8. In a cooling system for insulated electrodes, the combination of a receptacle, a cooling medium therein consisting of a mixture of water and a miscible lubricant, a heat transferring apparatus, tubular connections between the said receptacle and apparatus, a pump located within the said receptacle and submerged in the cooling medium therein, the stuffing box of which also is located in said receptacle, and means for operating said pump to cause circulatory movement of the cooling medium through the said system to thereby effect cooling of an electrode.

9. In a cooling system for insulated electrodes, the combination of a lubricating and heat transferring mixed liquid, an enveloping closed system for said liquid, said closed system comprising an electrode, a heat transferring apparatus, and means for circulating said liquid through said closed system, said means comprising a pump embodying solid lubricating bearings.

10. In a cooling system for insulated electrodes, the combination of a lubricating and heat transferring mixed liquid, an enveloping closed system for said liquid, said enveloping closed system comprising an electrode, a heat transferring apparatus, means for circulating said liquid through said enveloping closed system, said means comprising a pump embodying solid lubricating bearings and a stuffing box, the low pressure end of said stuffing box being within the said enveloping closed system.

In testimony that I claim the foregoing as my invention, I have hereunto signed my name this twenty-fifth day of July, A. D. 1924.

FRANKLIN S. SMITH.